(12) United States Patent
Pankratz et al.

(10) Patent No.: US 10,503,260 B2
(45) Date of Patent: Dec. 10, 2019

(54) OPERATING UNIT FOR VEHICLE

(71) Applicant: Behr-Hella Thermocontrol GmbH, Stuttgart (DE)

(72) Inventors: Harri Pankratz, Lippstadt (DE); Bastian Bandlow, Lippstadt (DE); Matthias Stallein, Lippstadt (DE); Lars Heeper, Lippstadt (DE)

(73) Assignee: BEHR-HELLA THERMOCONTROL GMBH, Stuttgart (DE)

( * ) Notice: Subject to any disclaimer, the term of this patent is extended or adjusted under 35 U.S.C. 154(b) by 0 days.

(21) Appl. No.: 15/759,910

(22) PCT Filed: Sep. 12, 2016

(86) PCT No.: PCT/EP2016/071414
§ 371 (c)(1),
(2) Date: Mar. 14, 2018

(87) PCT Pub. No.: WO2017/046026
PCT Pub. Date: Mar. 23, 2017

(65) Prior Publication Data
US 2019/0050053 A1    Feb. 14, 2019

(30) Foreign Application Priority Data
Sep. 15, 2015  (DE) .......................... 10 2015 217 661

(51) Int. Cl.
*G06F 3/01*    (2006.01)
*G05G 5/03*    (2008.04)
(Continued)

(52) U.S. Cl.
CPC ............... *G06F 3/016* (2013.01); *G05G 5/03* (2013.01); *H01F 7/1638* (2013.01);
(Continued)

(58) Field of Classification Search
CPC ........... G06F 3/016; G06F 3/041–0416; G06F 2203/04105; G05G 1/02; G05G 5/03–05;
(Continued)

(56) References Cited

U.S. PATENT DOCUMENTS

2002/0047707 A1    4/2002  Schmidt
2006/0209037 A1*   9/2006  Wang ...................... G06F 3/016
                                                              345/173
(Continued)

FOREIGN PATENT DOCUMENTS

DE         10043805 A1    3/2002
DE    102008035907 A1    2/2010
(Continued)

OTHER PUBLICATIONS

International Preliminary Report on Patentability issued in Application No. PCT/EP2016/071414 dated Dec. 8, 2017, with English translation.
(Continued)

*Primary Examiner* — Nathan Danielsen
(74) *Attorney, Agent, or Firm* — Morgan, Lewis & Bockius LLP

(57) ABSTRACT

The operating unit for a vehicle is provided with a housing with a front face and an operating element which is arranged on the front face of the housing and has an operating surface. The operating element is mounted in a spring-elastic manner. Furthermore, at least one sensor is provided for detecting an actuation movement of the operating element. The operating unit additionally has at least one actuator for the feedback movement of the operating element in the case of an actuation movement of the operating element detected by the sensor as well as an analysis and control unit which is connected to the at least one sensor and to the actuator. The actuator is designed as an armature-type electromagnet with
(Continued)

Figure 1:
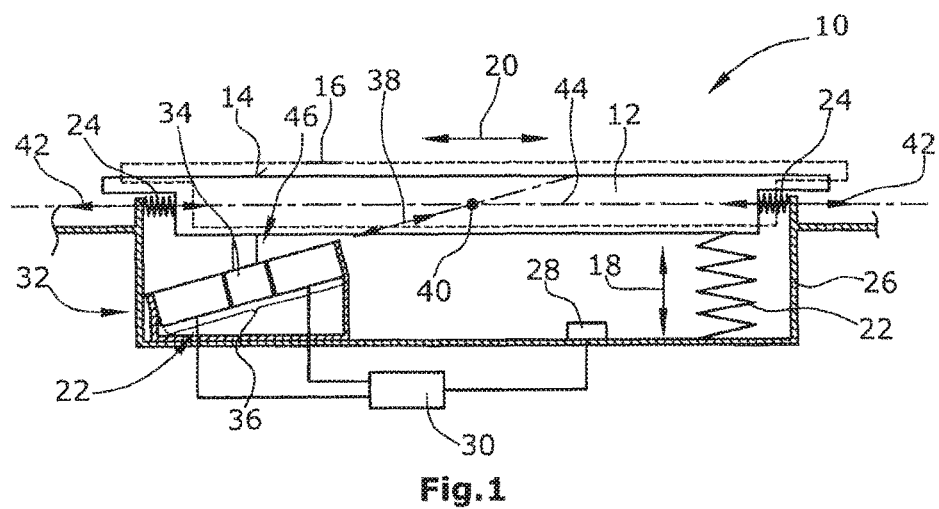

a first stator which has a first excitation coil, and an armature as a drive element. Furthermore, the armature is provided with a measuring coil to which a measuring voltage is applied when the magnetic flux generated by the first excitation coil flows through the armature. The first excitation coil and the measuring coil are connected to the analysis and control unit, and with the analysis and control unit it is possible to apply open-loop and/or closed-loop control to the force with which the armature of the actuator can move towards the first stator and/or the displacement movement of the armature out of its rest position and the return movement of the armature back into its rest position are adapted to be controlled and/or regulated.

3 Claims, 2 Drawing Sheets

(51) Int. Cl.
*H01F 7/16* (2006.01)
*G05G 1/02* (2006.01)
*B60W 50/14* (2012.01)

(52) U.S. Cl.
CPC ......... *B60W 2050/146* (2013.01); *G05G 1/02* (2013.01); *H01F 2007/1684* (2013.01)

(58) Field of Classification Search
CPC .... H01F 7/1607; H01F 7/1615; H01F 7/1638; H01F 7/1646; H01F 2007/1684; H01F 2007/1692; B60W 50/14; B60W 50/16; B60W 2050/146
See application file for complete search history.

(56) References Cited

U.S. PATENT DOCUMENTS

| | | | |
|---|---|---|---|
| 2006/0256075 | A1 | 11/2006 | Anastas et al. |
| 2011/0043474 | A1 | 2/2011 | Anastas et al. |
| 2012/0212723 | A1* | 8/2012 | Hol .......................... H01F 7/081 355/67 |
| 2013/0257571 | A1* | 10/2013 | Kahl ................... F16K 31/0679 335/229 |

FOREIGN PATENT DOCUMENTS

| | | |
|---|---|---|
| DE | 102009007243 A1 | 8/2010 |
| DE | 202011004616 U1 | 6/2011 |
| DE | 102012000568 A1 | 7/2013 |
| FR | 2927709 A1 | 8/2009 |
| WO | 2006/124873 A1 | 11/2006 |

OTHER PUBLICATIONS

International Search Report issued in Application No. PCT/EP2016/071414 dated Dec. 14, 2016.
Entire file history of U.S. Appl. No. 15/759,926, filed Mar. 14, 2018.

* cited by examiner

OPERATING UNIT FOR VEHICLE

RELATED APPLICATIONS

This application is the U.S. National Phase under 35 U.S.C. § 371 of International Application No. PCT/EP2016/071414, filed on Sep. 12, 2016, which in turn claims the benefit of German Application No. 10 2015 217 661.4, filed on Sep. 15, 2015, the disclosures of which are incorporated in their entirety by reference herein.

The invention relates to an operating unit for a vehicle, which may be an infotainment system for operating various vehicle components, for example.

Operating units having display assemblies on which, for example, various symbol fields are adapted to be represented in a menu-driven manner via which the functions for a vehicle component can be selected by effective actuation, e. g. pressing (also referred to as force sense), are becoming more and more popular. The operator is to receive a tactile confirmation of the selection of a function in the form of an additional active movement of the operating element after its activation (so-called force feedback), for example.

From DE-A-10 2008 035 907 and DE-A-10 2012 000 568 touch-sensitive input device are known. From DE-A-10 2009 007 243 a laterally spring-elastically mounted operating element of an input device is known. Further in DE-A-100 43 805 an electromechanical actuator for the valve operation of an internal combustion engine is disclosed, wherein the actuator is provided with a measuring coil.

For installation space and cost reasons an electromagnet (armature-type magnet) without permanent magnets is frequently employed as an actuator. The stator of such an armature-type magnet is thus to be electromagnetically operated. For adjusting the desired movement of the operating surface of the operating element the temporal force progression at the actuator must be exactly adjustable. In addition, it may be required that the force by means of which the operating element is moved forwards and backwards is respectively actively built up. This may be realized by means of a double armature-type magnet having a common armature between two electromagnetic stators.

In the case of slowly varying magnetic fields the force of an electromagnet essentially depends on the armature current and the air gap between the armature and the stator. The force progression in the case of the haptic feedback is hover ever very dynamic and comprises frequency components above 1 kHz. Here, the connection between current and force in the case of normally used machining steels or electrical sheets for guiding the magnetic flux is not trivial and can only be described by a very complex modeling. In addition, the air gap is not exactly known due to the mechanical tolerances and the movement of the operating surface, therefore the force action of an armature-type magnet can only be roughly estimated.

It is an object of the invention to provide a relatively exact and inexpensive force measurement in an actuator configured as an electromagnet for the haptic feedback from operating elements of an operating unit for a vehicle. For this purpose the electromagnet may be configured as a single armature or a double armature.

For achieving this object the invention suggests an operating unit for a vehicle, wherein the operating unit is provided with
 a housing having a front face,
 an operating element arranged on the front face of the housing, which comprises an operating surface, wherein the operating element is spring-elastically mounted,
 at least one sensor for detecting an actuation movement of the operating element,
 at least one (e. g. electromagnetic or piezoelectric) actuator for a feedback movement of the operating element in the case of an actuation movement of the operating element detected by the sensor, and
 an analysis and control unit which is connected to the at least one sensor and the actuator.

According to the invention, in such an operating unit it is provided that
 the actuator is configured as an armature-type electromagnet having a first stator comprising a first excitation coil and an armature as a drive element,
 the armature is provided with a measuring coil to which a measuring voltage is applied when a magnetic flux generated by the first excitation coil flows through the armature, and
 the first excitation coil and the measuring coil are connected to the analysis and control unit, wherein by means of the analysis and control unit the force is adapted to be controlled and/or regulated with the aid of which the armature of the actuator is adapted to be moved towards the first stator and/or with the aid of which the displacement movement of the armature out of its rest position as well as the return movement of the armature into its rest position are adapted to be controlled and/or regulated.

With the approach according to the invention for measuring the magnetic flux flowing through the armature by means of a measuring coil and the induced voltage dropping at the latter, the force and the movement of the armature can be controlled and/or regulated. Further, the movement of the armature can be purposely dampened such that an overshooting in the respective end position of the forward and backward movement of the armature can be avoided.

It may further be advantageous when the armature is arranged between two electromagnetically operated stators. In this embodiment of the invention, the armature thus comprises a second stator having a second excitation coil, wherein the two stators are arranged on both sides of the armature and the second excitation coil is also connected to the analysis and control unit, wherein by means of the analysis and control unit the respective force is adapted to be controlled and/or regulated with the aid of which the drive element is adapted to be moved in the respective direction towards the first and/or the second stator and/or the displacement movement of the drive element out of its rest position as well as the backward movement of the drive element into its rest position are to be controlled and/or regulated.

For realizing as homogeneous as possible a haptic feedback across the overall operating surface the operating unit may advantageously be provided with
 a housing having a front face
 an operating element arranged on the front face of the housing, which comprises a center of gravity and an operating surface,
 wherein the control element is spring-elastically mounted at and/or in the housing along a vertical movement axis essentially extending orthogonally to the operating surface and along a lateral movement axis essentially extending transversely with respect thereto, at least one sensor for detecting an actuation movement of the operating element in the direction of the vertical movement axis, an actuator mounted in and/or at the housing for a feedback movement of the operating element at least also along the lateral movement axis in the case of a recognized actuation movement of the operating element, wherein the actuator comprises a drive element adapted to be electromagnetically controlled and mechanically coupled with the operating element, which is adapted to be moved forwards and backwards along an effective movement axis, and an analysis and control unit which is connected to the sensor and the actuator, wherein the center of gravity of the operating element lies on the effective movement axis of the drive element of the actuator.

According to this aspect of the invention, the active haptic feedback of an actuation of the operating element is realized by a lateral displacement of the operating element. For actuation purposes the operating element is moved along a vertical movement axis essentially extending orthogonally to the operating surface. If the sensor detects this actuation movement (force sense) an active movement of the operating element (force feedback) e. g. in a lateral movement direction or with a movement component in a lateral direction (e. g. by a mechanical excitation along a direction at an acute angle to the operating surface e. g. to the left or to the right, upwards or downward) is carried out. Care must be taken that the operating element does not tilt. The operating element essentially comprises a display having a corresponding display design and technology (LCD display, for example) and backlighting such that it may have a considerable overall installation depth. Since in the ideal case the actuator may at best be arranged directly beneath this operating element, its drive element engages with the latter in the lateral movement direction outside the center of gravity of the operating element for performing an active haptic feedback movement. Without any corresponding measures this inevitably results in a tilting of the operating element, which is undesired. Known solutions aim at a forced guide with a corresponding design of the spring system by means of which the operating element is mounted to the housing of the operating unit. This involves a large mechanical effort.

Therefore this aspect of the invention provides for the operating element and the actuator to be mechanically arranged such that they are aligned relative to each other in such a way that the center of gravity of the operating element lies on the effective movement axis of the drive element. On the extension of the effective movement axis of the drive element thus lies the center of gravity of the operating element. The effective movement axis of the drive element thus extends at an acute angle to the intended lateral movement direction for the active haptic feedback. Due to the operating element being moved along the effective movement axis of the drive element the feedback movement of the operating element comprises a vertical movement component besides the lateral movement component, but this has no disturbing effect. Rather, it is crucial that the operating surface of the operating element maintains its alignment in the space for the active haptic feedback, that is experiences a transverse parallel displacement.

It can thus generally be said that due to the excitation of the operating element for the haptic feedback the resultant movement of the operating element in the form of a lateral main movement and a secondary movement normal to the operating surface is carried out. Depending on the attack angle of the excitation the magnitude of the normal movement component may vary. Thus, as a rule, no pure lateral movement takes place.

This measure allows for the active haptic feedback movement to be carried out in a purely translatory manner (with vertical and lateral movement components) in that the effective direction of the drive element passes through the center of gravity of the operating element.

Rotatory movement components in the haptic feedback of the operating element are further reduced by the return spring elements, with the aid of which the operating elements are returned into the initial position after an active haptic feedback, lying in a common plane with the center of gravity of the operating element. Here, the effective spring axes coincide with the effective movement axis of the drive element of the actuator. If this were not the case, the pattern of the active haptic feedback movement of the operating element would comprise rotatory components. For installation space reasons the effective axes of the springs typically extend in parallel to the effective movement axis of the drive element of the actuator on both sides of this effective movement axis, whereby unwanted moments, which might act upon the operating element during its return movement into the initial position, are neutralized to a large extent.

Further, it is advantageous to actively control or regulate the haptics in a forward and return path. For this purpose it is also crucial that the movement of the operating element is purely translatory, if possible, which can be realized with the approach according to the invention. Further, the approach according to the invention essentially ensures that the haptic sensation is always the same independent of the actuation location on the operating surface. According to the invention, complex constructive solutions for spring mounting of the operating element such that the latter executes a purely translatory movement are no longer required.

It is appropriate when the lateral movement axis of the operating element and the effective movement axis of the drive element of the actuator span a common vertical plane extending essentially orthogonally to the operating surface.

According to another aspect of the invention it may be provided that the housing comprises an installation space beneath the operating element and that for achieving the smallest possible angle between the effective movement axis of the drive element of the actuator and the lateral movement axis of the operating element the actuator is arranged as near as possible beneath the operating element as allowed by the installation space and/or as far away as possible from the center of gravity of the operating element as allowed by the installation space. The smaller the angle between the effective movement axis of the actuator and the lateral movement axis of the operating element, the larger is the lateral movement component of the operating element with respect to the lateral movement component of the feedback movement.

According to another aspect of the invention, the operating unit comprises return spring elements for the operating element having effective spring axes arranged on both sides of the operating element which lie on the lateral movement axis or in a plane which extends essentially orthogonally to the plane spanned by the effective movement axis of the drive element of the actuator and the lateral movement axis of the operating element and are arranged symmetrically to the lateral movement axis.

Figure 2:
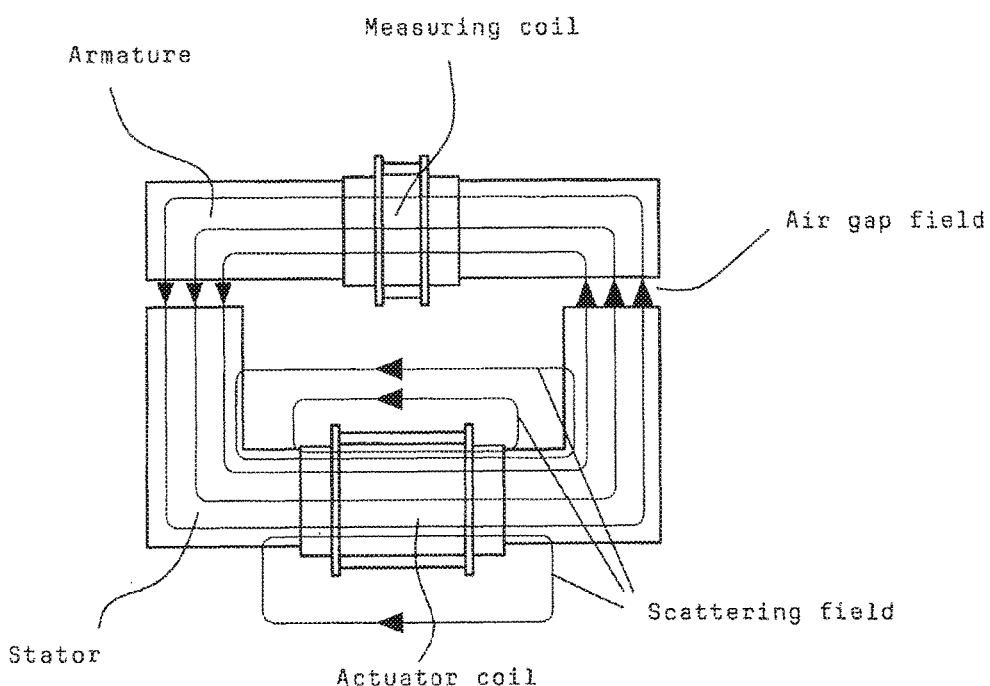
Figure 3:
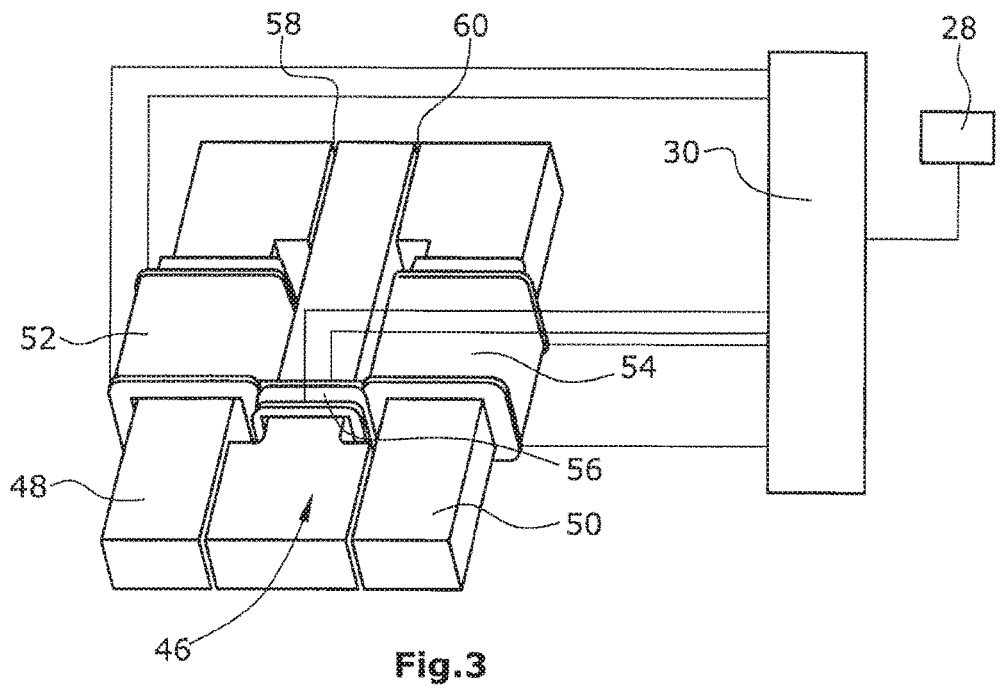
Figure 4:
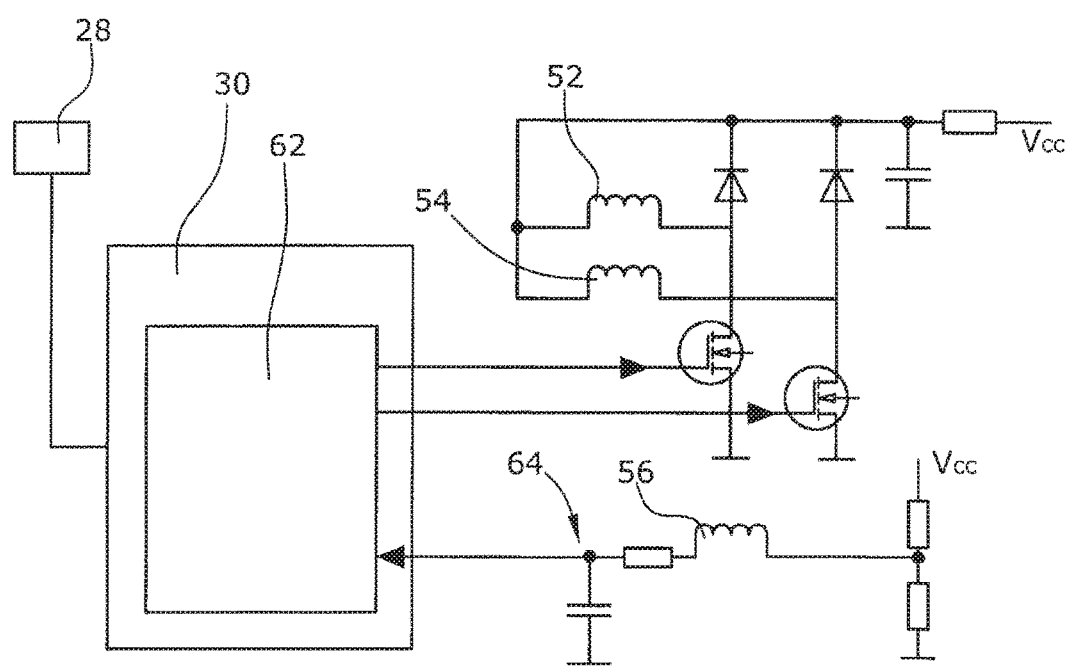

Hereunder the invention is described in detail on the basis of an exemplary embodiment with reference to the drawings in which:

FIG. 1 schematically shows a side view of an operating unit for a vehicle component having an operating element configured as a display element and spring-elastic mounting as well as an active haptic feedback for actuating the operating element, FIG. 2 shows a diagram of an electromagnet configured as an armature-type magnet having a stator and an armature for basically explaining the electromagnetically relevant properties of such an electromagnet, FIG. 3 shows a perspective diagram of the actuator configured as a double electromagnet for the active haptic feedback, and FIG. 4 shows a possible circuit configuration of the electromagnet as per FIG. 3.

In FIG. 1 a schematic side view of an operating unit 10 comprising an operating element 12 is shown. In this exemplary embodiment, the operating element 12 is configured as a display assembly having an operating surface 14 on which a plurality of symbol fields 16 are adapted to be represented. As a rule, the operating element 12 is backlit.

For executing an actuation movement in a vertical movement direction (see double arrow 18) as well as for confirming such an actuation movement in a lateral direction (see double arrow 20 in FIG. 1) the operating element 12 is elastically mounted at a housing 26 via first springs 22 as well as second springs 24. A sensor 28 can determine that the operating element has moved along the vertical movement axis 18. This is ascertained in an analysis and control unit 30, where-upon the latter controls an actuator 32 configured as an electromagnet which comprises a drive element 34. The fixed stator portion 36 of the actuator 32 is supported on the housing 26 while the drive element 34 of the actuator 32 is mechanically coupled with the operating element 12. The effective movement axis of the drive element 34 is shown by the double arrow 38.

The larger and more complex the design of the operating element 12, the heavier it is and the more installation space it occupies. If it is required that the haptic feedback is the same across the overall operating surface 14, the operating element 12 should exclusively execute a translatory movement for the haptic feedback. Theoretically, this can be realized in a very simple manner in that the drive element 34 of the actuator 32 engages in the center of gravity 40 of the operating element 12. However, the given installation space does not allow for this.

If it is still intended that the operating element 12 exclusively executes a translatory movement for the haptic feedback, a comparatively simple design solution is to arrange the actuator 32 such that the center of gravity 40 of the operating element 12 lies on the effective movement axis 38 of the drive element 34 of the actuator 32. This is shown in FIG. 1, wherein FIG. 1 also illustrates how the operating element 12 actively moves when an actuation movement is recognized and the actuation of the operating element 12 is confirmed by a haptic feedback. It should be noted here that the second spring elements 24 and/or their effective spring axes 42 ideally lie in a plane in which the center of gravity 40 is also located and in which the effective movement axis 38 of the actuator 32 lies, wherein the effective axes of the actuator 32 and the second springs 24 lie on a common line or extend in parallel to the effective axis 38 of the actuator 32 (in FIG. 1 this is indicated by the dashed double arrows 42).

Essentially orthogonally to this plane 44 extends that plane that is spanned by the lateral movement axis 20 of the operating element 12 and the effective movement axis 38 of the drive element 34 of the actuator 32. With reference to FIG. 1 this plane is the drawing plane.

The purely translatory movement of the operating element 12 for the haptic feedback thus comprises both a lateral and a vertical component. The fact that this feedback movement is not purely lateral is of no importance regarding the fact that the haptic sensation is to be the same across the overall operating surface 14 of the operating element 12. It is crucial that the operating element 12 does not execute any rotatory movement for the haptic feedback, that is that there is a parallel displacement of the operating element 12 in the space.

As has already been described above, in particular for installation space and cost reasons an electromagnet is often used as an actuator for the haptic feedback of operating elements. The force applied by this electromagnet can be estimated only at an increased effort and essentially depends on the current and the air gap of the electromagnet. The applicable conditions in the case of an electromagnet are hereinafter elucidated on the basis of FIG. 2.

In FIG. 2 an electromagnet is illustrated whose stator and armature are made of highly permeable materials (usually machining steel or electrical sheet) and whose magnetic field is built up by means of an energized excitation coil.

The force of such an electromagnet is usually calculated from the excitation current and the size of the air gap. The force progression in the case of the haptic feedback is however very dynamic with frequency components above 1 kHz. Here, the connection between current and force in the case of the normally used machining steels or electrical sheets for guiding the magnetic flux is not trivial and can only be described by a very complex modeling. In addition, the air gap is not exactly known due to the mechanical tolerances and the movement of the operating surface and therefore the force action of the actuator can only be roughly estimated. By the use of the "Maxwell tensile strength formula" and a measuring coil for determining the magnetic flux density in the air gap this problem can be avoided, wherein, as a rule, a voltage measurement is more inexpensive than a current measurement:

$$F = \frac{B_L^2 A_L}{2\mu_0}$$

(F—actuator force, $\mu_0$—permeability of the air, $A_L$—air gap surface, $B_L$—magnetic flux density in the air gap)

The relatively low inhomogeneity of the air gap flux density in practical applications can be accounted for by a correction factor, which, in turn, leads to a simple realization of a force measurement by means of a measuring coil:

$$F(t) = \frac{C}{\mu_0 A_L} \left( \frac{1}{N_{MS}} \int_0^t u(t')dt' \right)^2$$

(t—time, C—air gap correction factor, $N_{MS}$—number of windings of the measuring coil, u(t)—induced voltage in the measuring coil)

The integration of the induced voltage can be digitally carried out with a microcontroller which normally exists in the system. Thus the force is known at any time during the control process.

FIG. 3 shows a perspective view of the actuator 32. This actuator 32 is configured as a double electromagnet whose drive element 34 serving as an armature 46, which is arranged between a first stator 48 and a second stator 50, can build up a force in two opposite directions along the effective movement axis 38.

The first and the second stator 48, 50 are fastened to the housing 26, while the armature 46 is fixedly connected to the operating element 12. The first stator 48 comprises a first excitation coil 52, while the second stator 50 is provided with a second excitation coil 54. The armature 46 is surrounded by a measuring coil 56. On both sides of the armature 46 a first and a second air gap 58, 60 are respectively located. Since the force acting upon the armature 46 is respectively to be directed in one direction the excitation coils 52, 54 are not energized simultaneously but alternately. The arrangement of the measuring coil 56 at the armature 46 allows for an exact and inexpensive force measurement in both effective directions along the effective movement axis 38.

As an example, the control and the analysis of the voltage induced in the measuring coil 56 may be carried out by means of a microcontroller 62 which may form part of the analysis and control unit 30. An example of a circuit configuration including the microcontroller 62 is shown in FIG. 4. The induced voltage in the measuring coil 56 is at first smoothed by a simple low pass 64 to eliminate from the measured signal the PWM clocking (frequency normally >20 kHz) for alternately controlling the two excitation coils 52, 54. Thereafter the microcontroller 62 detects the induced voltage and digitally integrates it. The limiting frequency of the low pass 64 should be sufficiently higher than the highest frequency components of the force progression.

LIST OF REFERENCE NUMERALS

10 Operating unit
12 Operating element
14 Operating surface of the operating element
16 Symbol fields
18 Vertical movement axis of the operating element
20 Lateral movement axis of the operating element
22 Spring elements
24 Spring elements
26 Housing
28 Sensor
30 Control unit
32 Actuator
34 Drive element of the actuator
36 Stator portion of the actuator
38 Effective movement axis of the actuator
40 Center of gravity of the operating element
42 Effective spring axis
44 Plane
46 Armature
48 Stator
50 Stator
52 Excitation coil
54 Excitation coil
56 Measuring coil
58 Air gap
60 Air gap
62 Microcontroller
64 Low pass

The invention claimed is:

1. An operating unit for a vehicle component, in particular an infotainment system for operating various vehicle components, having
a housing having a front face,
an operating element arranged on said front face of said housing, which comprises an operating surface, wherein said operating element is spring-elastically mounted,
at least one sensor for detecting an actuation movement of said operating element, at least one actuator for a feedback movement of said operating element in the case of an actuation movement of said operating element detected by said sensor, and
an analysis and control unit which is connected to said at least one sensor and said actuator, wherein
said actuator is configured as an armature-type electromagnet having a first stator comprising a first excitation coil, and an armature as a drive element,
said armature is provided with a measuring coil Which surrounds a middle portion of said armature and to which a measuring voltage is applied when a magnetic flux generated by said first excitation coil flows through said armature,
said first excitation coil and said measuring coil are connected to said analysis and control unit, wherein by means of said analysis and control unit a force is adapted to be controlled or regulated with the aid of which said armature of said actuator is adapted to be moved into a direction towards or away from said first stator, where movement into the direction includes displacement movement of said armature out of its rest position as well as return movement of said armature into its rest position, and
said actuator is arranged such that the first direction into which said actuator is adapted to be moved is tilted with respect to the operating surface of said operating element.

2. The operating unit according to claim 1, wherein the armature-type electromagnet further comprises a second stator having a second excitation coil, wherein the first and second stators are arranged on both sides of the armature, and wherein said second excitation coil is also connected to the analysis and control unit, wherein by means of said analysis and control unit a respective force is adapted to be controlled or regulated with the aid of which said armature is adapted to be moved into a respective direction towards or away from the first stator and away from or towards the second stator, where movement into the respective direction includes the displacement movement of said armature out of its rest position as well as the return movement of said armature into its rest position.

3. An operating unit for a vehicle component, in particular an infotainment system for operating various vehicle components, having
a housing having a front face,
an operating element arranged on said front face of said housing, which comprises an operating surface, wherein said operating element is spring-elastically mounted,
at least one sensor for detecting an actuation movement of said operating element, at least one actuator for a feedback movement of said operating element in the case of an actuation movement of said operating element detected by said sensor, and
an analysis and control unit which is connected to said at least one sensor and said actuator, wherein
said actuator is configured as an armature-type electromagnet having a first stator comprising a first excitation coil, and an armature as a drive element, said armature is provided with a measuring coil to which a measuring voltage is applied when a magnetic flux generated by said first excitation coil flows through said armature, said first excitation coil and said measuring coil are connected to said analysis and control unit, wherein by means of said analysis and control unit a force is adapted to be controlled or regulated with the aid of which said armature of said actuator is adapted to be moved into a first direction towards or away from said first stator, where movement into the first direction includes displacement movement of said armature out of its rest position as well as return movement of said armature into its rest position, and said actuator is arranged such that the first direction into which said actuator is adapted to be moved is tilted with respect to the operating surface of said operating element.

* * * * *